US009769086B2

(12) United States Patent
Agbabian et al.

(10) Patent No.: US 9,769,086 B2
(45) Date of Patent: Sep. 19, 2017

(54) TECHNIQUES FOR PROVIDING DYNAMIC ACCOUNT AND DEVICE MANAGEMENT

(71) Applicant: Symantec Corporation, Mountain View, CA (US)

(72) Inventors: Paul Agbabian, Los Angeles, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 62 days.

(21) Appl. No.: 14/659,194

(22) Filed: Mar. 16, 2015

(65) Prior Publication Data

US 2015/0188846 A1 Jul. 2, 2015

Related U.S. Application Data

(63) Continuation of application No. 13/524,795, filed on Jun. 15, 2012, now Pat. No. 8,984,111.

(51) Int. Cl.
*G06F 15/173* (2006.01)
*H04L 12/927* (2013.01)
(Continued)

(52) U.S. Cl.
CPC ........ *H04L 47/808* (2013.01); *H04L 43/0888* (2013.01); *H04L 63/0807* (2013.01); *H04L 63/102* (2013.01); *H04L 67/306* (2013.01)

(58) Field of Classification Search
CPC ............... H04L 63/102; H04L 63/0807; H04L 43/0888; H04L 67/306; H04L 47/808; H04L 63/10
(Continued)

(56) References Cited

U.S. PATENT DOCUMENTS 6,957,261 B2 * 10/2005 Lortz .................. H04L 41/0893
709/226
7,240,364 B1 7/2007 Branscomb et al.
(Continued)

FOREIGN PATENT DOCUMENTS

| CN | 1831833 A | 9/2006 |
| CN | 1901475 A | 1/2007 |
| CN | 103299658 A | 9/2013 |

OTHER PUBLICATIONS

International Search Report and Written Opinion issued by the U.S. Patent and Trademark Office as International Searching Authority for International Application No. PCT/US2013/044356, dated Sep. 27, 2013 (9 pages).
(Continued)

*Primary Examiner* — Frantz Jean
(74) *Attorney, Agent, or Firm* — Wilmer Cutler Pickering Hale and Dorr LLP

(57) ABSTRACT

Techniques for providing data in dynamic account and device management are disclosed. In one particular exemplary embodiment, the techniques may be realized as a system for providing data in dynamic account and device management. The system may comprise one or more processors communicatively coupled to a network. The one or more processors may be configured to identify a user device to be managed. The one or more processors may be configured to transmit a request for delegate authority to manage the user device. The one or more processors may be configured to receive delegate authority to manage the user device. The one or more processors may be configured to provide network access to the user device. The one or more processors may also be configured to manage the user device and monitor data communicated to and from the user device.

23 Claims, 5 Drawing Sheets

(51) Int. Cl.
*H04L 29/06* (2006.01)
*H04L 12/26* (2006.01)
*H04L 29/08* (2006.01)

(58) Field of Classification Search
USPC .............. 709/223, 224; 726/3, 4; 380/277
See application file for complete search history.

(56) References Cited

U.S. PATENT DOCUMENTS

| | | | |
|---|---|---|---|
| 8,086,508 B2* | 12/2011 | Dheer | G06F 17/30899 |
| | | | 705/1.1 |
| 8,676,990 B2 | 3/2014 | Joyce et al. | |
| 8,984,111 B2 | 3/2015 | Agbabian et al. | |
| 2002/0161999 A1* | 10/2002 | Gunter | G06F 21/33 |
| | | | 713/168 |
| 2002/0174048 A1 | 11/2002 | Dheer et al. | |
| 2004/0073801 A1* | 4/2004 | Kalogridis | G06F 21/305 |
| | | | 713/176 |
| 2006/0031451 A1* | 2/2006 | Lortz | H04L 41/0893 |
| | | | 709/223 |
| 2006/0195814 A1 | 8/2006 | Tsao et al. | |
| 2008/0075291 A1* | 3/2008 | Kamijoh | H04L 9/0836 |
| | | | 380/279 |
| 2009/0300744 A1 | 12/2009 | Guo et al. | |
| 2010/0077451 A1 | 3/2010 | Fujimoto et al. | |
| 2011/0055404 A1 | 3/2011 | Joyce et al. | |
| 2011/0055899 A1* | 3/2011 | Dollar | H04L 41/28 |
| | | | 726/3 |
| 2011/0295992 A1* | 12/2011 | Lee | H04L 12/2874 |
| | | | 709/223 |
| 2012/0131685 A1 | 5/2012 | Broch et al. | |
| 2014/0126581 A1 | 5/2014 | Wang et al. | |

OTHER PUBLICATIONS

Chinese Office Action issued by the State Intellectual Property Office of the People's Republic of China for Chinese Application No. 201380038468.3 dated Apr. 5, 2017 (15 pages).

* cited by examiner

TECHNIQUES FOR PROVIDING DYNAMIC ACCOUNT AND DEVICE MANAGEMENT

CROSS-REFERENCE TO RELATED APPLICATIONS

This patent application is a continuation of U.S. patent application Ser. No. 13/524,795, filed Jun. 15, 2012, now U.S. Pat. No. 8,984,111, which is hereby incorporated by reference herein in its entirety.

FIELD OF THE DISCLOSURE

The present disclosure relates generally to systems management and, more particularly, to techniques for providing dynamic account and device management.

BACKGROUND OF THE DISCLOSURE

More and more companies are allowing employees to bring their personal computing devices to work and use them in the work environment. Managing these personal devices and monitoring data communicated using these devices within a corporate setting are becoming increasingly challenging, especially across multiple management systems and multiple accounts.

In view of the foregoing, it may be understood that there may be significant problems and shortcomings associated with conventional account and device management technologies as applied to personal computing devices used in a corporate infrastructure.

SUMMARY OF THE DISCLOSURE

Techniques for providing dynamic account and device management are disclosed. In one particular exemplary embodiment, the techniques may be realized as a system for providing data in dynamic account and device management. The system may comprise one or more processors communicatively coupled to a network. The one or more processors may be configured to identify a user device to be managed. The one or more processors may be configured to transmit a request for delegate authority to manage the user device. The one or more processors may be configured to receive delegate authority to manage the user device. The one or more processors may be configured to provide network access to the user device. The one or more processors may also be configured to manage the user device and monitor data communicated to and from the user device.

In accordance with other aspects of this particular embodiment, the user device may be a personal user device associated with a personal user account. In some embodiments, the personal user account may comprise at least one of an Internet-based account, a cloud-accessible account, and an enterprise-compatible account. In some embodiments, the delegate authority may be granted by a primary accountholder of via the personal user account.

In accordance with further aspects of this particular embodiment, identifying the user device to be managed may comprise receiving a request by a user of the user device for network access.

In accordance with additional aspects of this particular embodiment, identifying the user device to be managed may comprise detecting the user device within range of the network.

In accordance with other aspects of this particular embodiment, the request for delegate authority may comprise at least one of an email, a text message, an instant message, a phone call, a voicemail, a website, a uniform resource locator (URL) link, and a menu window.

In accordance with further aspects of this particular embodiment, network access may comprise network access to at least one of a corporate network, enterprise network, residential network, and private network.

In another particular embodiment, the techniques may be realized as a method for providing dynamic account and user device management. The method may comprise identifying, using a computer, a user device to be managed. The method may comprise transmitting a request for delegate authority to manage the user device. The method may comprise receiving delegate authority to manage the user device. The method may comprise providing network access to the user device. The method may comprise managing the user device and monitor data communicated to and from the user device.

In accordance with other aspects of this particular embodiment, the user device may be a personal user device associated with a personal user account comprising at least one of: an Internet-based account, a cloud-accessible account, and an enterprise-compatible account.

In accordance with further aspects of this particular embodiment, identifying the user device to be managed may comprise at least one of: receiving a request by a user of the user device for network access, and detecting the user device within range of the network;

In accordance with additional aspects of this particular embodiment, the request for delegate authority may comprise at least one of: an email, a text message, an instant message, a phone call, a voicemail, a website, a uniform resource locator (URL) link, and a menu window.

In accordance with other aspects of this particular embodiment, network access may comprise network access to at least one of: a corporate network, enterprise network, residential network, and private network.

In another particular embodiment, the techniques may be realized as a system for providing dynamic account and user device management. The system may comprise one or more processors communicatively coupled to a network. The one or more processors may be configured to receive a request for delegate authority by an entity to manage a user device. The one or more processors may be configured to transmit information required to provide delegate authority to manage the user device. The one or more processors may be configured to receive network access at the user device, wherein the entity manages the user device and monitors data communicated to and from the user device.

In accordance with other aspects of this particular embodiment, the user device may be a personal user device associated with a personal user account. In some embodiments, the personal user account may comprise at least one of an Internet-based account, a cloud-accessible account, and an enterprise-compatible account. In some embodiments, the delegate authority may be granted by a primary accountholder of via the personal user account.

In accordance with further aspects of this particular embodiment, the system may provide identity of the user device to be managed by receiving a request by a user of the user device for network access or detecting the user device within range of the network.

In accordance with additional aspects of this particular embodiment, the information required to provide delegate authority may comprise at least primary account holder identity information, primary account holder verification information, and delegate authority selection.

In accordance with other aspects of this particular embodiment, the request for delegate authority may comprise at least one of an email, a text message, an instant message, a phone call, a voicemail, a website, a uniform resource locator (URL) link, and a menu window.

In accordance with further aspects of this particular embodiment, network access may comprise network access to at least one of a corporate network, enterprise network, residential network, and private network.

In another particular embodiment, the techniques may be realized as a method for providing dynamic account and user device management. The method may comprise receiving a request for delegate authority by an entity to manage a user device. The method may comprise transmitting information required to provide delegate authority to manage the user device. The method may comprise receiving network access at the user device, wherein the entity manages the user device and monitors data communicated to and from the user device.

In accordance with other aspects of this particular embodiment, the method may comprise providing identity of the user device to be managed by receiving a request by a user of the user device for network access or detecting the user device within range of the network.

In accordance with further aspects of this particular embodiment, the user device may be a personal user device associated with a personal user account comprising at least one of: an Internet-based account, a cloud-accessible account, and an enterprise-compatible account.

In accordance with additional aspects of this particular embodiment, the information required to provide delegate authority may comprise at least primary account holder identity information, primary account holder verification information, and delegate authority selection.

In accordance with other aspects of this particular embodiment, the request for delegate authority may comprise at least one of: an email, a text message, an instant message, a phone call, a voicemail, a website, a uniform resource locator (URL) link, and a menu window.

In accordance with further aspects of this particular embodiment, network access may comprise network access to at least one of: a corporate network, enterprise network, residential network, and private network.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
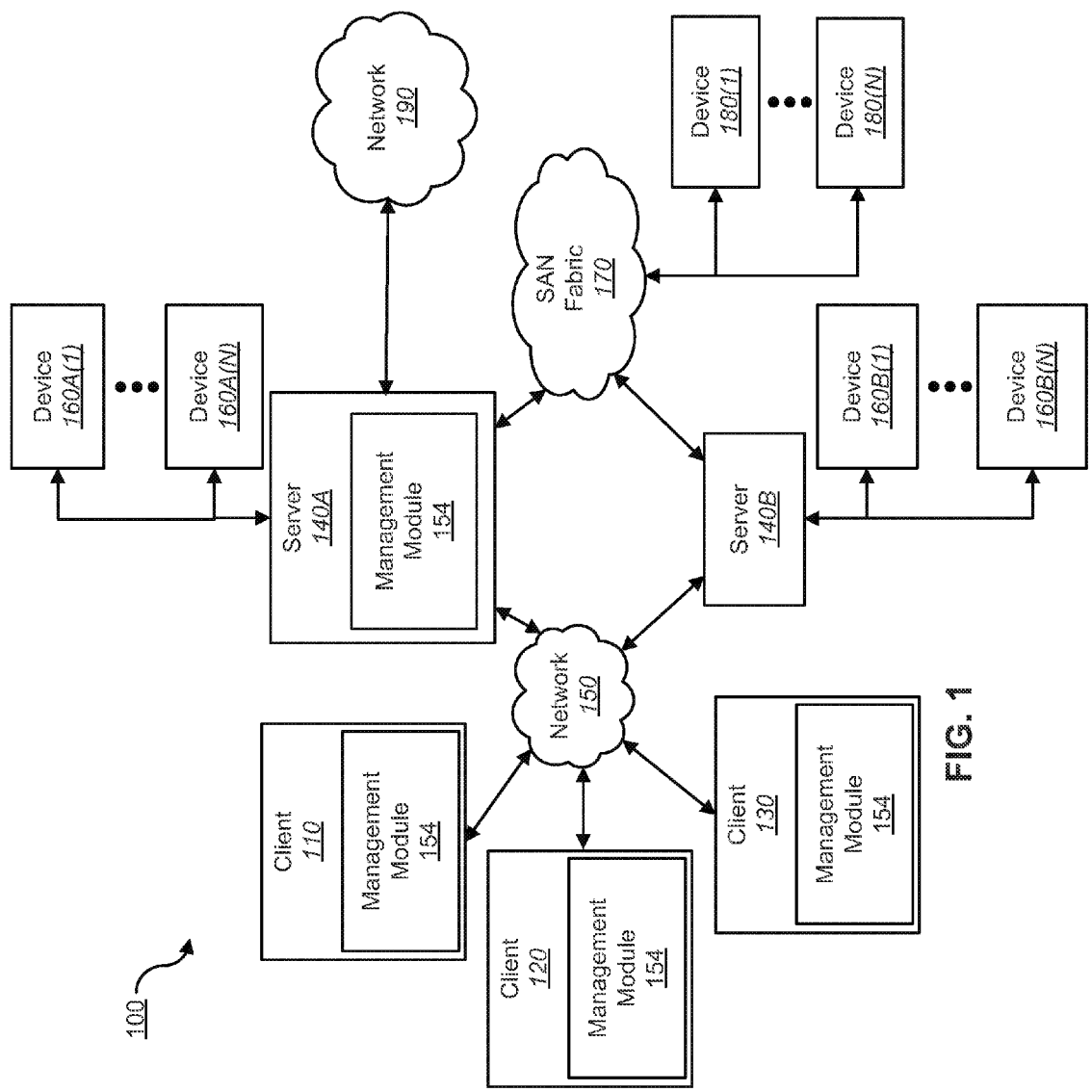
FIG. 1 shows a block diagram depicting a network architecture for providing dynamic account and device management in accordance with an embodiment of the present disclosure.

FIG. 1 shows a block diagram depicting a network architecture 100 for providing dynamic account and device management in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., management module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
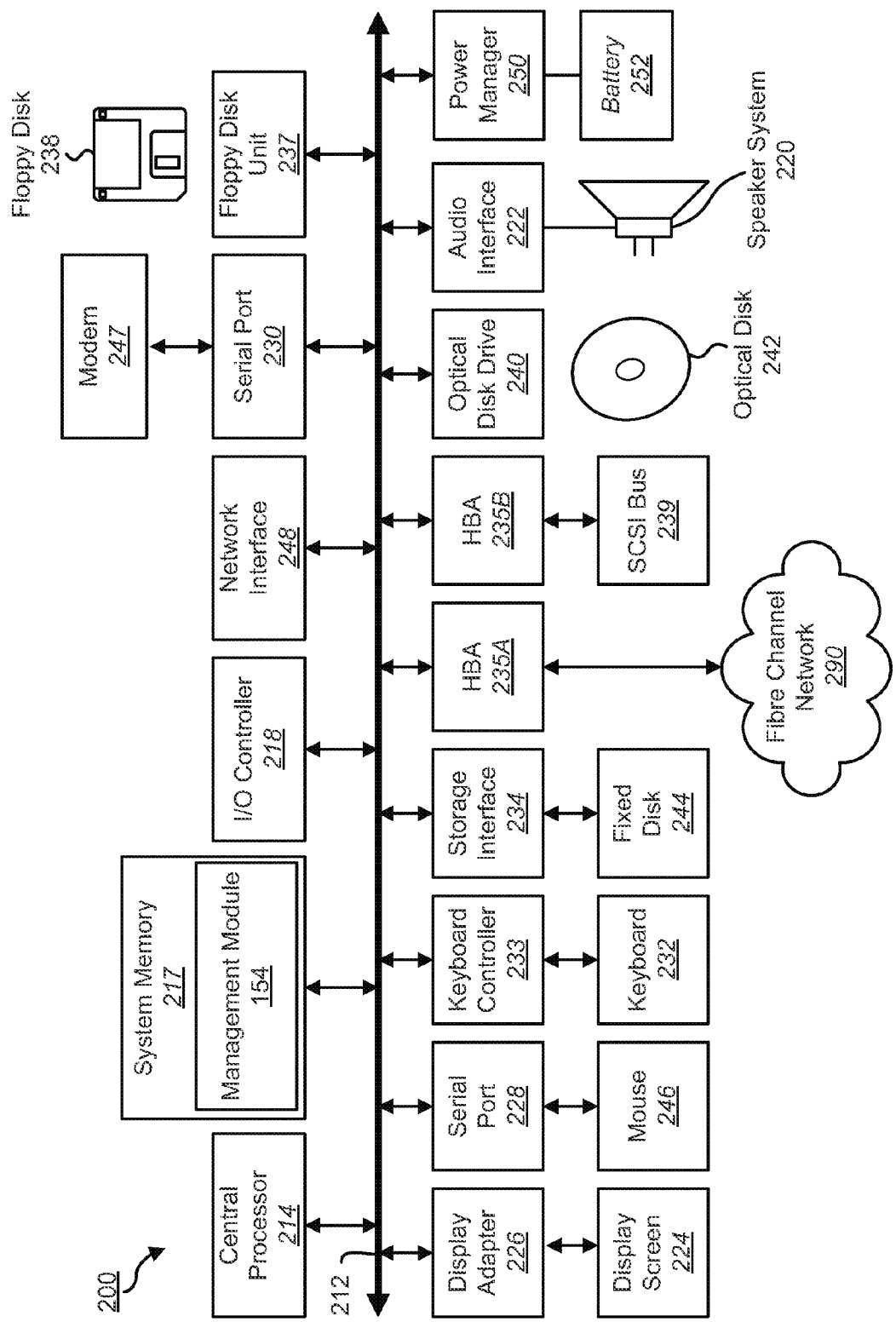
FIG. 2 depicts a block diagram of a computer system for providing dynamic account and device management in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for providing dynamic account and device management such as, for example, management module 154. As illustrated, one or more portions of management module 154 may reside at a network centric location. For example, server 140A may be a server, a firewall, a gateway, or other network element that may perform one or more actions to provide dynamic account and device management. According to some embodiments, network 190 may be an external network (e.g., the Internet) and server 140A may be a gateway or firewall between one or more internal components and clients and the external network.

Management module 154 may provide, among other things, dynamic account authority for delegated scope of control over software and device management for an enterprise or corporate entity. As described above, more and more companies are allowing employees to bring their personal computing devices to work and use them in the work environment. However, managing these personal devices and monitoring data communicated using these devices within a corporate setting is becoming increasingly challenging, especially across multiple management systems and multiple accounts.

A personal user account may define scope of control for a user and his or her computing device. The personal user account may also define software and services associated with the user or computing device. For example, a personal user account may contain a user profile, a user identity, and/or other related user credentials. Other various items may be registered to the personal user account as well. For example, one or more devices, one or more applications (e.g., software applications), and/or services may be registered to the personal user account. Accordingly, when a user authenticates himself or herself with the personal account, the user may have access and control of devices, applications, and/or services registered to the personal user account.

In order for another entity (e.g., a business, employer, family member, etc.) to manage some or all of the devices, applications, and/or services associated with the personal user account, that entity may require some measure of authorization to access the personal user account. Such authority may be delegated to the entity by the user or account holder of the personal user account.

In order to provide such delegated authority, the management module 154 may interact with a personal user account. In some embodiments, the personal user account may be an Internet-based, cloud-accessible account, or enterprise-compatible account, although other types of accounts may be used as well.

The management module 154 may have device management capabilities. The management module 154 may also have capabilities to add one or more authorized delegates to the personal user account. The one or more authorized delegate may be authenticated in various ways. For example, in some embodiments, the one or more authorized delegates may be authorized by the personal user account. In other embodiments, the one or more authorized delegates may be authorized by another authorizing account different from the personal user account. In other embodiments, the one or more authorized delegates may be authorized by some other trusted identity or source.

In some embodiments, an owner or account holder of the personal user account may also grant access (e.g., entire or partial access) to his or her device associated with the personal user account before assigning a delegate, either by an authorizing account or identity authorizes the delegate. For example, a user (e.g., employee) may desire to use his or her personal computing device in a corporate setting (e.g., employer entity) to check email and/or perform other work-related functions. The user may put in a request (e.g., with the Information Technology (IT) department of the employer entity) to have his or her personal computing device configured to operate in the corporate setting.

In response, the entity may send a communication to the owner or account holder of the personal user account to authenticate the personal user account and register the entity as a delegate. For instance, the entity may send an email having an embedded uniform resource locator (URL) link to the owner or account holder of the personal user account to authenticate the personal user account and register the entity as a delegate. The URL may direct the owner or account holder to a website or menu window to verify him or herself as the owner or account holder and to delegate authority to the entity. Other various communications, such as text message, instant message, phone call, and voicemail, may also be utilized.

In some embodiments, a delegate may be registered without use of email with URL link. For example, when a user brings his or her personal user device within a vicinity of a corporate network, the corporate network may detect the personal user device. Upon detection or upon use of the personal device within the vicinity of the corporate network, a window (e.g., a pop-up menu or other similar indicator) may be presented at the user device so that the user of the device (presumably the owner or account holder of the personal user account) may authenticate the personal user account and register the entity associated with the corporate network as a delegate.

Delegate authority may have a range of authority. For example, authority granted to the entity may be partial authority (manage some of the device functions, applications and/or services) or total authority (manage all of the device functions, applications and/or services). It should be appreciated that the level of authority granted to the delegate may be customizable by the owner of the personal user account, by the policies and standards of the entity, by the capabilities of the device/account management system, or a combination thereof.

There may be several ways to provide delegated authority to a user device. One way may be to register explicit lists of networks for each account delegate. Another way may be to associate a URL only available on the corporate network (e.g., LAN) with the delegate. Here, the management module 154 of the user device may attempt to connect to the URL before granting the agreed upon control to the delegate account. Yet another way may be to use network discovery mechanisms, such as the user device broadcast a request for local network specific management or a local server notify new user devices of the requirement for local network specific management. In some embodiments, server-pushed notifications may be a part of a dynamic host configuration protocol (DHCP) response or sent out of band in response to a DHCP request, antenna reference point (ARP) discovery, or other client network activity. Other various device or network discovery mechanisms may also be utilized.

It should be appreciated that in some embodiments, delegate authority may be granted or received within a directory-like service, where there may be a single authority over all resources. Management systems using the same authority may have rights delegated in a static manner, e.g., based on groups, roles, permissions, other similar way. In other embodiments, the same authority may not be required. Rather, delegated authority may be dynamic and not based on role-based access control or other static parameters.

It should be appreciated that the management module 154 may utilize publicly accessible application programming interfaces (APIs) to facilitate delegate registration for managing accounts and associated devices. It should also be appreciated that the owner or account holder of a personal user account and associated device may have power to terminate or revoke delegate authority. As a result, management module 154 may provide dynamic account and device management without forfeiting end user control.

By providing dynamic account authority for delegated scope of control over software and device management, managing personal user devices and monitoring data communicated using these devices within a corporate setting may become much easier. Allowing multiple management systems to have authority to manage and monitor the same personal user device dynamically may allow business entities (or families) an attractive way to integrate use of personal user devices while still maintaining sufficient degree of control.

FIG. 2 depicts a block diagram 200 of a computer system for providing dynamic account and device management in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, management module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
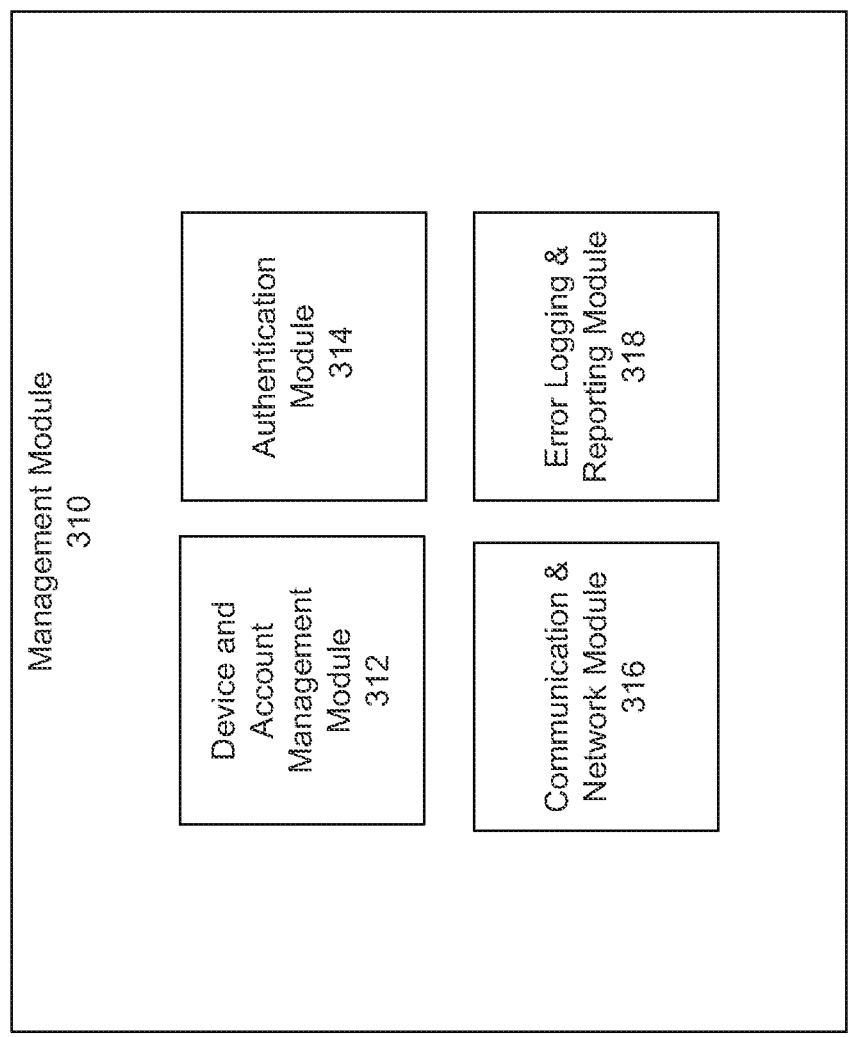
FIG. 3 shows a module for providing dynamic account and device management in accordance with an embodiment of the present disclosure.

FIG. 3 shows a module 310 for providing dynamic account and device management in accordance with an embodiment of the present disclosure. Referring to FIG. 3, there is shown a management module 310 in accordance with an embodiment of the present disclosure. As illustrated, the management module 310 may contain one or more components including device and account management module 312, authentication module 314, communication and network module 316, and error logging and reporting module 318.

The description below describes network elements, computers, and/or components of a system and method for providing dynamic account and device management that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Device and account management module 312 may manage one or more devices and/or one or more accounts. These device and/or accounts may include personal user devices brought by a user (e.g., employee) and used within specific network (e.g., corporate network).

Authentication module 314 may manage various delegate authority an entity has over various personal user devices and/or personal user accounts. Authentication module 314 may also coordinate with personal user devices and/or personal user accounts to ensure delegate authority is valid and up to date.

Communication and network module 316 may provide, among other things, various features, including, but not limited to single sign-on, device detection, device communication, and/or other network or communication related functions and features.

Error logging and reporting module 318 may produce logs, reports, or other information associated with providing dynamic account and device management.

Each of the modules of the management module 310 may, singly or collective, perform one or more of the functions required to providing dynamic account and device management as described herein.

Figure 4:
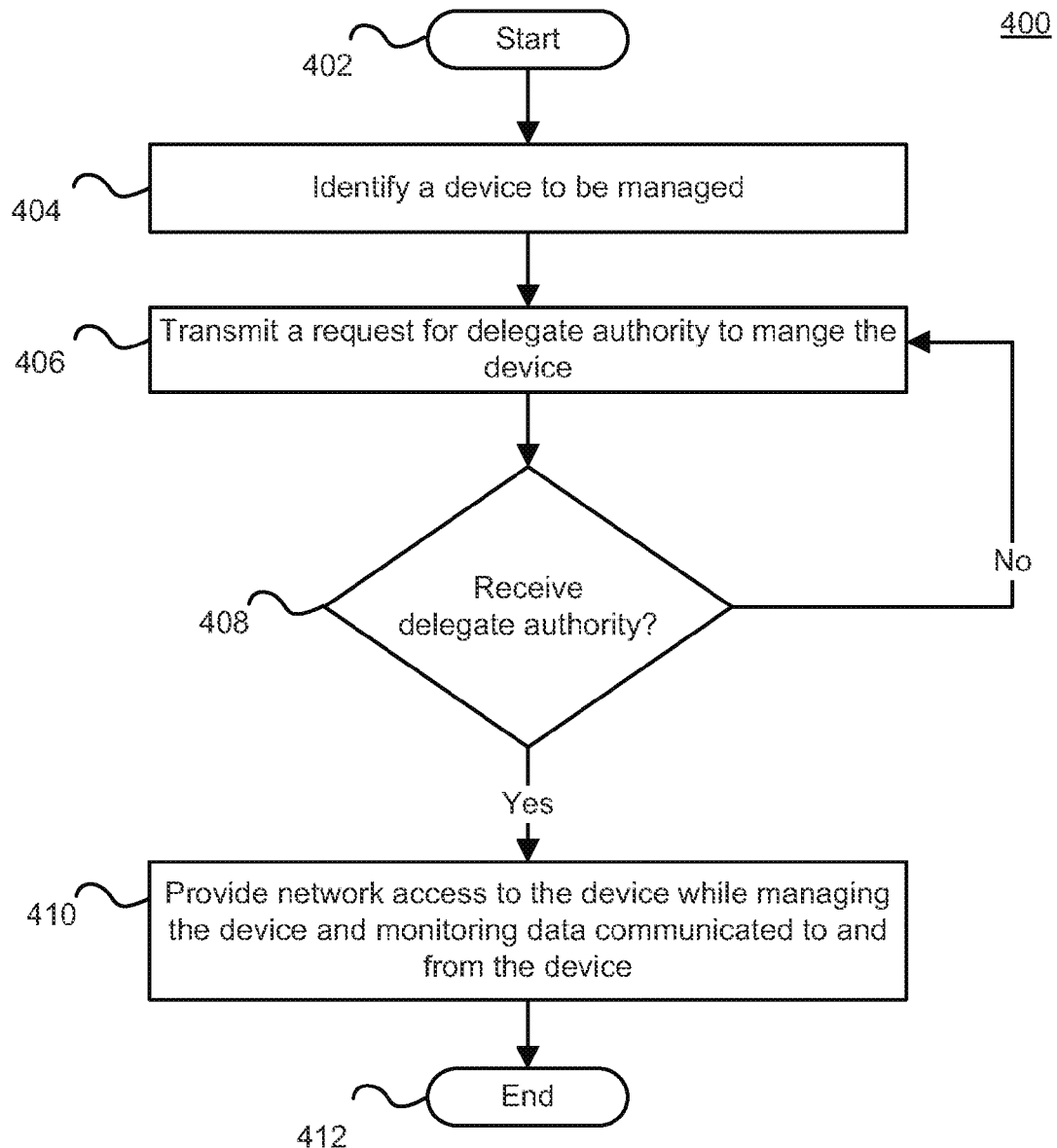
FIG. 4 depicts a flowchart of a method for providing dynamic account and device management in accordance with an embodiment of the present disclosure.

FIG. 4 depicts a flowchart 400 of a method for providing dynamic account and device management in accordance with an embodiment of the present disclosure. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by at least system 100 in FIG. 1, architecture 200 in FIG. 2, module 310 in FIG. 3, and schematic 400 of FIG. 4, by way of example, and various elements of systems 100, 200, 310, and 400 are referenced in explaining the exemplary method of FIG. 4. Each block shown in FIG. 4 represents one or more processes, methods, or subroutines carried in the exemplary method 400. A non-transitory computer-readable medium comprising code, which when performed by a computer, may perform the acts of the method 400 may also be provided. Referring to FIG. 4, the exemplary method 400 may begin at block 402.

At block 402, the method 400 may begin.

At block 404, the management module 310 may identify a user device to be managed using at least the device and account management module 312 or the communication and network module 316. The user device may be a personal user device associated with a personal user account. The personal user account may comprise at least one of an Internet-based account, a cloud-accessible account, and an enterprise-compatible account.

In some embodiments, identifying the user device to be managed may comprise receiving a request by a user of the user device for network access. In other embodiments, identifying the user device to be managed may comprise detecting the user device within range of the network.

At block 406, the management module 310 may transmit a request for delegate authority to manage the user device using at least the authentication module 314 or the communication and network module 316. In some embodiments, the request for delegate authority may comprise at least one of an email, a text message, an instant message, a phone call, a voicemail, a website, a uniform resource locator (URL) link, and a menu window.

At block 408, the management module 310 may receive delegate authority to manage the user device using at least the authentication module 314 or the communication and network module 316. The delegate authority may be granted or revoked by a primary accountholder of via the personal user account.

At block 410, the management module 310 may provide network access to the user device using at least the communication and network module 316. In some embodiments, the management module 310 may manage the user device and monitor data communicated to and from the user device using at least the device and account management module 312. Network access may comprise network access to at least one of a corporate network, enterprise network, residential network, and private network.

At block 412, the method 400 may end.

Figure 5:
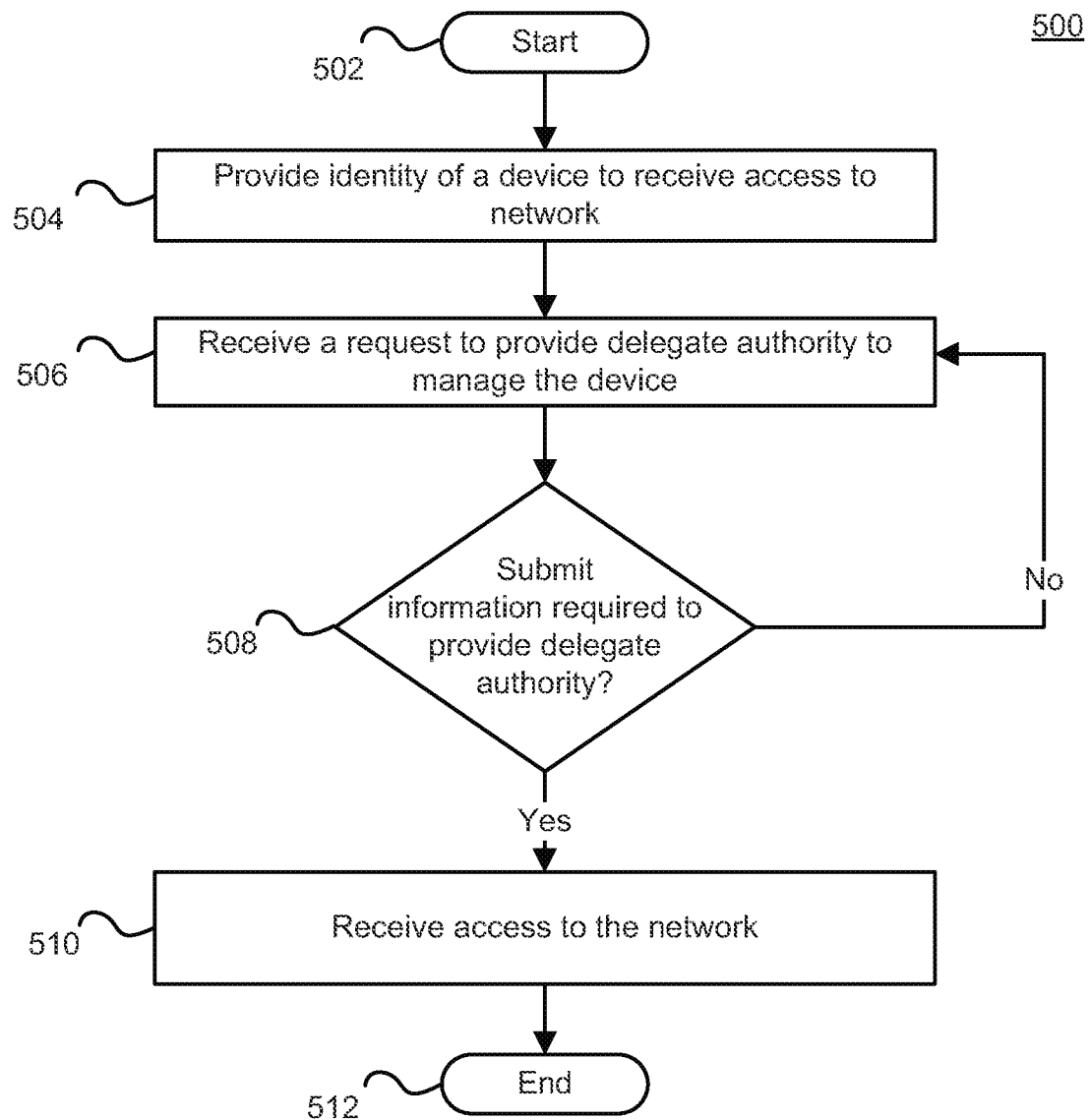
FIG. 5 depicts a flowchart of a method for providing dynamic account and device management in accordance with an embodiment of the present disclosure.

FIG. 5 depicts a flowchart 500 of a method for providing dynamic account and device management in accordance with an embodiment of the present disclosure. The exemplary method 500 is provided by way of example, as there are a variety of ways to carry out methods disclosed herein. The method 500 shown in FIG. 5 may be executed or otherwise performed by one or a combination of various systems. The method 500 is described below as carried out by at least system 100 in FIG. 1, architecture 200 in FIG. 2, module 310 in FIG. 3, and schematic 400 of FIG. 4, by way of example, and various elements of systems 100, 200, 310, and 400 are referenced in explaining the exemplary method of FIG. 5. Each block shown in FIG. 5 represents one or more processes, methods, or subroutines carried in the exemplary method 500. A non-transitory computer-readable medium comprising code, which when performed by a computer, may perform the acts of the method 500 may also be provided. Referring to FIG. 5, the exemplary method 500 may begin at block 502.

At block 502, the method 500 may begin.

At block 504, the management module 310 may provide identity of the user device to be managed using at least the device and account management module 312 or the communication and network module 316. In some embodiments, providing identity of the user device to be managed may comprise receiving a request by a user of the user device for network access. In other embodiments, providing identity of the user device to be managed may comprise detecting the user device within range of the network.

The user device may be a personal user device associated with a personal user account. The personal user account may comprise at least one of an Internet-based account, a cloud-accessible account, and an enterprise-compatible account.

At block 506, the management module 310 may receive a request for delegate authority by an entity to manage a user device using at least the authentication module 314 or the communication and network module 316. In some embodiments, the request for delegate authority may comprise at least one of an email, a text message, an instant message, a phone call, a voicemail, a website, a uniform resource locator (URL) link, and a menu window.

At block 508, the management module 310 may transmit information required to provide delegate authority to manage the user device using at least the authentication module 314 or the communication and network module 316. The information required to provide delegate authority may comprise at least primary account holder identity information, primary account holder verification information, and delegate authority selection. It should be appreciated that the delegate authority may be granted or revoked by a primary accountholder of via the personal user account.

At block 510, the management module 310 may receive network access at the user device using at least the communication and network module 316. In some embodiments, receive network access at the user device also comprises the management module 310 managing the user device and monitoring data communicated to and from the user device using at least the device and account management module 312. Network access may comprise network access to at least one of a corporate network, enterprise network, residential network, and private network.

At block 512, the method 400 may end.

At this point it should be noted that providing dynamic account and device management in accordance with the present disclosure as described above typically involves the processing of input data and the generation of output data to some extent. This input data processing and output data generation may be implemented in hardware or software. For example, specific electronic components may be employed in a management module or similar or related circuitry for implementing the functions associated with providing dynamic account and device management in accordance with the present disclosure as described above. Alternatively, one or more processors operating in accordance with instructions may implement the functions associated with providing dynamic account and device management in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for providing dynamic account and user device management comprising:
transmitting a request for delegate authority to manage a personal electronic user device within a telecommunications network in response to receiving a request from the user device for access to the network;
receiving from the user device delegate authority to manage the user device; and
managing the user device and monitoring data communicated to and from the user device within the network in accordance with a level of authority delegated by the user device.

2. The method of claim 1, wherein the user device is associated with a personal user account comprising at least one of an Internet-based account, a cloud-accessible account, and an enterprise-compatible account.

3. The method of claim 2, wherein the delegate authority is granted by a primary accountholder of the personal user account.

4. The method of claim 1, further comprising:
identifying the user device to be managed.

5. The method of claim 4, wherein identifying the user device to be managed comprises receiving a request by a user of the user device for network access.

6. The method of claim 4, wherein identifying the user device to be managed comprises detecting the user device within range of the network.

7. The method of claim 1, wherein the request for delegate authority comprises at least one of an email, a text message, an instant message, a phone call, a voicemail, a website, a uniform resource locator (URL) link, and a menu window.

8. The method of claim 1, further comprising:
providing network access to the user device.

9. The method of claim 8, wherein the network access comprises network access to at least one of a corporate network, enterprise network, residential network, and private network.

10. The method of claim 1, wherein the delegate authority comprises a range of authority.

11. The method of claim 10, wherein the range of authority comprises partial or total authority, wherein the range of authority is customizable based on at least one of an owner of the user device, an account holder of the user device, policies and standards of an entity requesting delegate authority, and capabilities of an management system of the entity.

12. A system for providing dynamic account and user device management comprising:
   one or more processors communicatively coupled to a network, wherein the one or more processors are configured to:
      transmit a request for delegate authority to manage a personal electronic user device within a telecommunications network in response to receiving a request from the user device for access to the network;
      receive from the user device delegate authority to manage the user device; and
      manage the user device and monitoring data communicated to and from the user device within the network in accordance with a level of authority delegated by the user device.

13. The system of claim 12, wherein the user device is associated with a personal user account comprising at least one of an Internet-based account, a cloud-accessible account, and an enterprise-compatible account.

14. The system of claim 13, wherein the delegate authority is granted by a primary accountholder of the personal user account.

15. The system of claim 12, wherein the one or more processors are configured to:
   identify the user device to be managed.

16. The system of claim 15, wherein identifying the user device to be managed comprises receiving a request by a user of the user device for network access.

17. The system of claim 15, wherein identifying the user device to be managed comprises detecting the user device within range of the network.

18. The system of claim 12, wherein the request for delegate authority comprises at least one of an email, a text message, an instant message, a phone call, a voicemail, a website, a uniform resource locator (URL) link, and a menu window.

19. The system of claim 12, wherein the one or more processors are configured to:
   provide network access to the user device.

20. The system of claim 19, wherein the network access comprises network access to at least one of a corporate network, enterprise network, residential network, and private network.

21. The system of claim 12, wherein the delegate authority comprises a range of authority.

22. The system of claim 21, wherein the range of authority comprises partial or total authority, wherein the range of authority is customizable based on at least one of an owner of the user device, an account holder of the user device, policies and standards of an entity requesting delegate authority, and capabilities of an management system of the entity.

23. An article of manufacture for providing dynamic account and user device management, the article of manufacture comprising:
   at least one non-transitory processor readable storage medium; and
   instructions stored on the at least one medium;
   wherein the instructions are configured to be readable from the at least one medium by at least one processor and thereby cause the at least one processor to operate so as to:
      transmit a request for delegate authority to manage a personal electronic user device within a telecommunications network in response to receiving a request from the user device for access to the network;
      receive from the user device delegate authority to manage the user device; and
      manage the user device and monitoring data communicated to and from the user device within the network in accordance with a level of authority delegated by the user device.

* * * * *